United States Patent [19]

Knapp

[11] Patent Number: 4,704,852
[45] Date of Patent: Nov. 10, 1987

[54] RAKE FOR BASEBALL AND SOFTBALL FIELDS

[76] Inventor: Richard W. Knapp, R.D. #2, Saegertown, Pa. 16422

[21] Appl. No.: 790,160

[22] Filed: Oct. 22, 1985

[51] Int. Cl.⁴ ............................................. A01D 7/00
[52] U.S. Cl. .................................................. 56/400.14
[58] Field of Search ...................... 56/396, 400, 400.1, 56/400.04, 400.09, 400.13, 400.14, 400.15, 400.16, 400.17, 400.18, 400.19, 400.2, 400.21

[56] References Cited

U.S. PATENT DOCUMENTS

| | | | |
|---|---|---|---|
| 1,351,643 | 8/1920 | Guthrie | 172/357 |
| 2,511,642 | 6/1950 | Law | 172/357 |
| 2,718,730 | 9/1955 | Brazeau | 172/357 |
| 2,796,011 | 6/1957 | Schmidt | 56/400.14 |
| 3,068,635 | 12/1962 | Cunningham | 56/400 |

Primary Examiner—Gene Mancene
Assistant Examiner—Wenceslao J. Contreras
Attorney, Agent, or Firm—Ralph Hammar

[57] ABSTRACT

A rake for softball and baseball infields and baselines which smooths the surface after each game without leaving any tracks. The rake may be pulled by hand or by a lightweight tractor.

4 Claims, 7 Drawing Figures

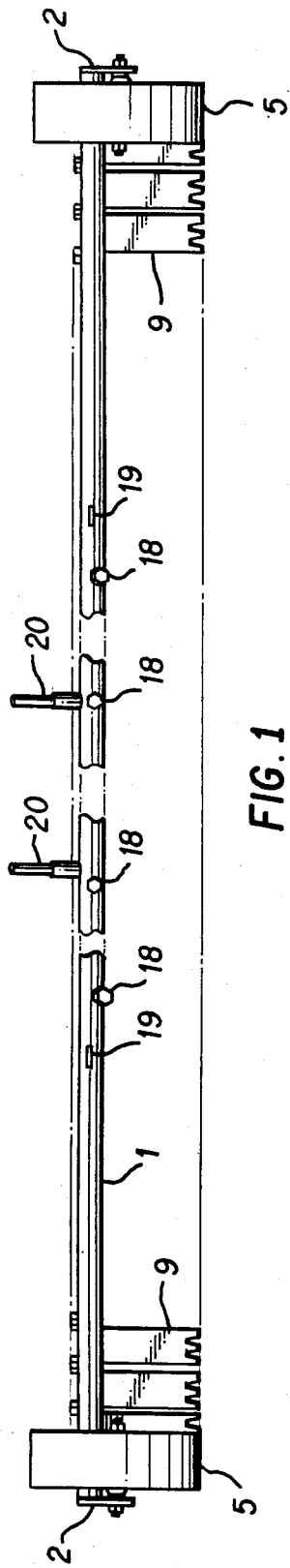
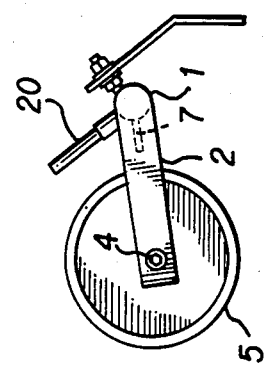
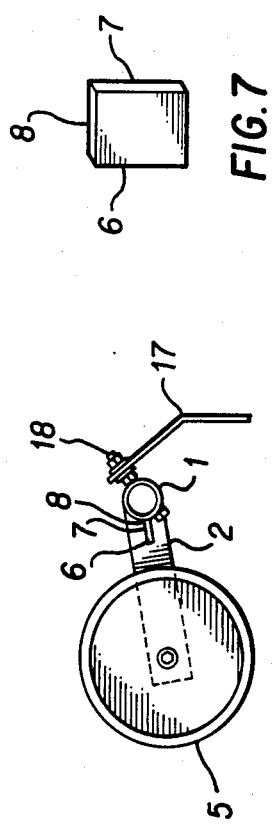
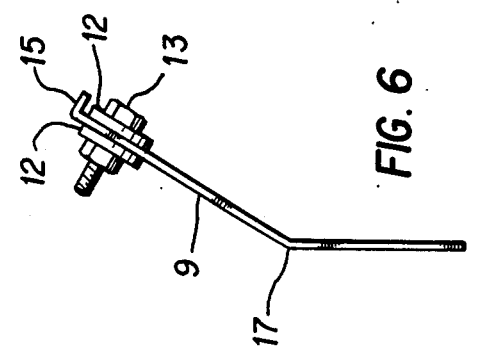
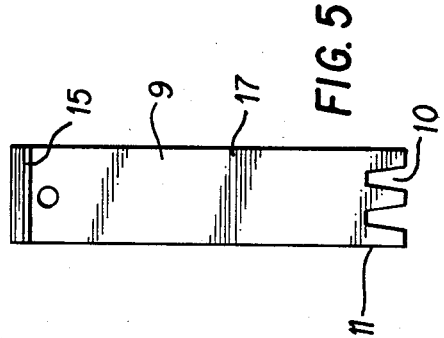
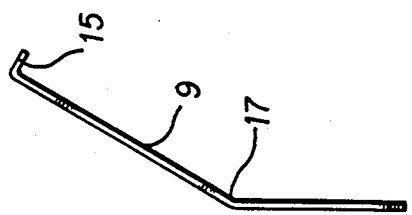

RAKE FOR BASEBALL AND SOFTBALL FIELDS

This invention is a rake for smoothing the infields and baselines of baseball and softball fields. It utilizes sheet metal teeth with serrated edges which produce a smooth surface in a single pass. In normal operation, dirt may pile up in front of the teeth which flows into depressions to produce an overall smooth and level surface.

In the drawing, FIG. 1 is a front elevation of a rake embodying the invention, FIG. 2 is a section on line 2—2 of FIG. 1, FIG. 3 is an end view of FIG. 1, FIGS. 4 and 5 are details of the teeth, FIG. 6 is a fragmentary view of the strip holding the teeth, and FIG. 7 is a view of the brace between the pipe 1 and the wheel supporting arms 2.

The frame consists of a length 1 of steel pipe extending the full width of the rake. At opposite ends of the frame are fixed crank arms 2 having holes at the front ends for receiving bolts 4 which serve as axles for wheels 5. A rectangular brace 6 fits between the inner face of each arm 2 and the frame 1. The side edge 7 of the brace adjacent the arm is welded to the arm and the end edge 8 of the brace is welded to the frame. This provides a rigid structure for supporting the wheels. Wheels always ride in front of the rake and the teeth of the rake always overlap the tracks left by the wheels so that when the rake passes over a surface footprints and wheel tracks are eliminated.

In a preferred form, the teeth of the rake comprise sheet metal strips 9 with serrations 10 in the raking surface forming flat ended teeth 11. In a preferred form, the space between the strips 9 is substantially equal to the width of the teeth 11 and the depth of the serrations 10 is about twice the width of the teeth. In the particular rake shown, the individual strips 9 are 1¼" wide, the serrations 10 are ¼" wide and ½" deep, the teeth 11 are ¼" wide at the ends and the strips 9 are ¼" apart. This provides a ground contacting surface with flat ended teeth which sink into the surface of the ground and lift the dirt up in front of the teeth. Excess dirt can move between the teeth and in the spaces at the bottoms of the serrations. The object is to provide a surface which has been smoothed and is free from irregularities.

The upper ends of the teeth 9 are sandwiched between elongated tooth supporting strips 12 and are fastened in place by bolts 13 extending through holes in the strips 12 and in the teeth. When positioned between the supporting strips 12, flanges 15 at the upper ends of the teeth lie against the upper edge of one of the tooth supporting strips 12 and the teeth extend from the assembly at a highly negative rake angle as shown in FIG. 3. At the midsection of each tooth, there is a knee bend 17 which makes the dirt contacting surface of the tooth less negative. At opposite ends of the tooth supporting strips 12 and at several points between the ends, the pipe frame 1 has holes for through bolts 18 which solidly bolt the tooth supporting strips 12 to the frame.

The rake is pulled over the playing field surface by a rope having opposite ends linked to eyes 19 in the front surface of the frame. The pull exerted by the rope on the eyes is insufficient to lift the teeth off the surface of the field. The weight of the rake is sufficient to maintain the required raking pressure. However, if additional raking pressure is needed, it may be supplied by adding weights (not shown) on spindles 20 attached to the center of the pipe 1. The rake so far described weighs about 25 pounds and it has not been found necessary to use the added weights for baseball or softball playing fields.

I claim:

1. A rake for baseball and softball infields and baselines comprising,
   an elongated frame,
   a series of sheet metal teeth spaced apart along the length of the frame with upper ends fixed to the frame and with lower ends engaging said surface to be raked, the lower ends of the teeth having spaced serrations providing individual flat bottomed teeth,
   a pair of wheel supporting arms respectively fixed to opposite ends of the frame and having free ends extending forward from the frame, an axle extending inward from each free ends, a wheel mounted on each axle, hitching means on the frame for towing the frame over the surface to be raked by hand or by power.

2. A rake for baseball and softball infields and baselines comprising,
   an elongated frame,
   a series of sheet metal teeth spaced apart along the length of the frame with upper ends fixed to the frame and with lower ends engaging said surface to be raked, the lower ends of the teeth having spaced serrations, the depth of the serrations being greater than the width of space between the serrations,
   a pair of wheel supporting arms respectively fixed to opposite ends of the frame and having free ends extending forward from the frame, an axle extending inward from each free end, a wheel mounted on each axle, hitching means on the frame for towing the frame over the surface to be raked by hand or by power.

3. The rake of claim 2 in which the depth of the serrations is about twice the width of the spaces between serrations.

4. The rake of claim 1 in which the space between the upper ends of adjacent teeth is substantially the same as the spacing between adjacent serrations.

* * * * *